United States Patent [19]

Romero

[11] 4,037,851
[45] July 26, 1977

[54] STORE MERCHANDISING APPARATUS

[75] Inventor: Victor R. Romero, Sheridan Township, Calhoun County, Mich.

[73] Assignee: Eagle Picher Industries, Inc., Cincinnati, Ohio

[21] Appl. No.: 628,198

[22] Filed: Nov. 3, 1975

[51] Int. Cl.² .............................................. B62B 3/02
[52] U.S. Cl. ................................................ 280/79.3
[58] Field of Search ............................ 280/79.3, 79.2; 211/133, 128, 206

[56] References Cited

U.S. PATENT DOCUMENTS

| 2,514,308 | 7/1950 | Burg | 280/79.3 |
| 3,495,718 | 2/1970 | Romero | 211/206 |

FOREIGN PATENT DOCUMENTS

| 451,008 | 9/1948 | Canada | 211/133 |
| 451,007 | 9/1948 | Canada | 211/133 |

Primary Examiner—Joseph F. Peters, Jr.
Assistant Examiner—Michael J. Forman
Attorney, Agent, or Firm—Blanchard, Flynn, Thiel, Boutell & Tanis

[57] ABSTRACT

A merchandising apparatus, specifically a mobile merchandising cart, having one or more wire shelves (or baskets) removably supported thereon. The cart includes a frame having a wheeled U-shaped base and a pair of upright posts fixed to the base and projecting upwardly from adjacent the rear corners thereof. The posts are fixedly connected by a cross brace located adjacent the upper ends thereof. Each post includes a vertically extending strip having a plurality of notches formed inwardly from the free edge thereof. One or more shelves are hooked into the notches so that the shelves extend between the posts while being vertically spaced apart. The shelves are preferably of a wire rod construction and include a pair of substantially horizontally extending rod elements on the back side thereof, which rod elements engage the notches associated with the posts. The shelves preferably have reinforcing members associated therewith which bear against the posts to maintain the individual shelves in a stable position whereby they project outwardly from the posts in a cantilevered fashion.

9 Claims, 12 Drawing Figures

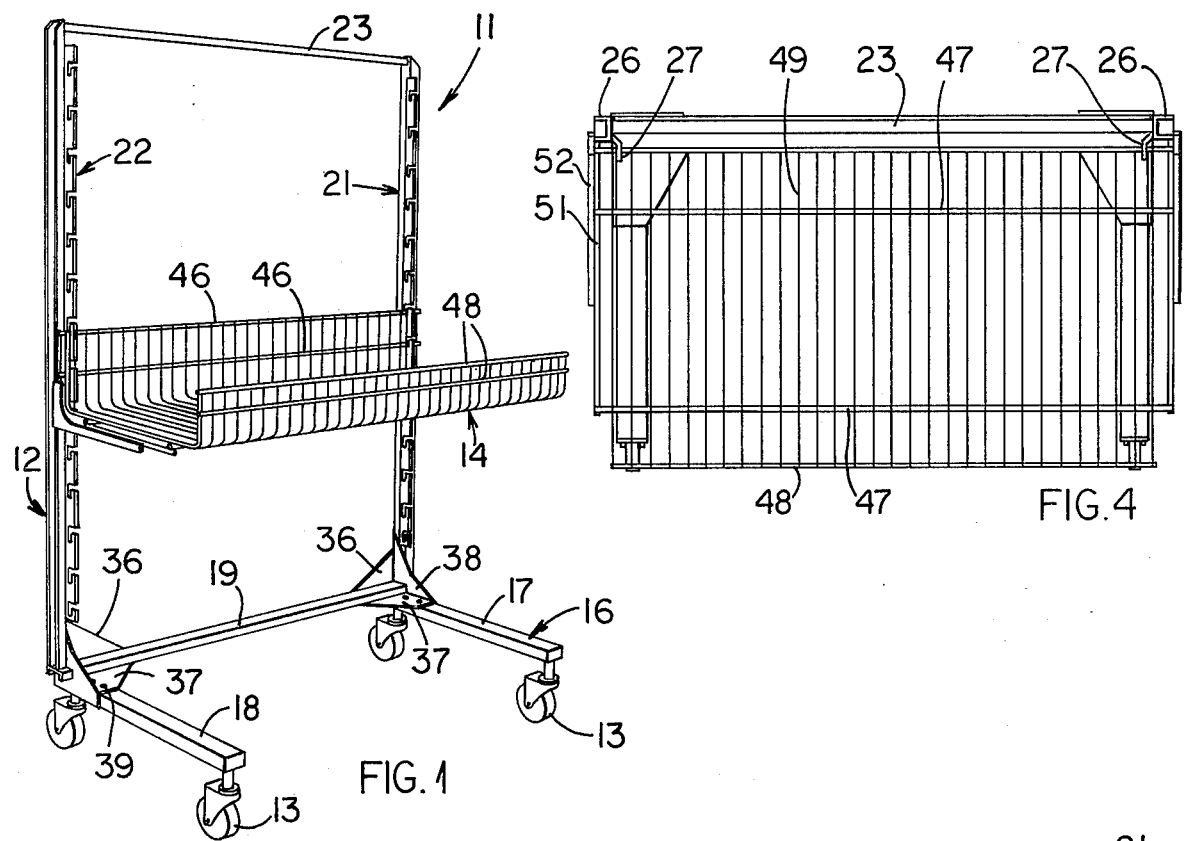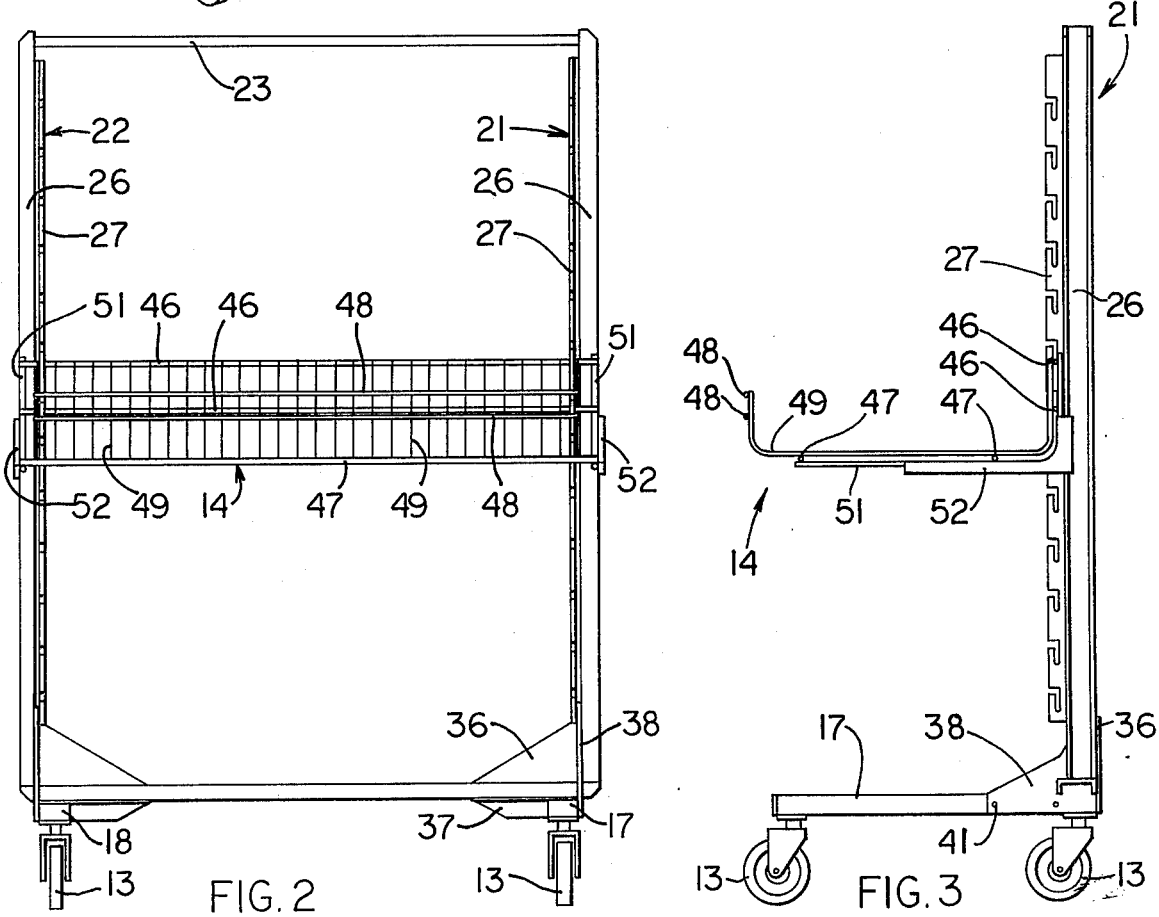

STORE MERCHANDISING APPARATUS

FIELD OF THE INVENTION

This invention relates to a merchandising apparatus and, in particular, to an improved mobile merchandising cart having one or more shelves or baskets removably supported thereon.

BACKGROUND OF THE INVENTION

Many grocery stores, supermarkets, discount stores, department stores and other retail merchandisers utilize display racks or stands which employ a stationary base or frame having vertical uprights associated therewith, which uprights have vertically spaced slots therein so that a plurality of baskets or shelves can be mounted on the uprights due to brackets on the shelves being engaged within the slots. Merchandising equipment of this type has been utilized with substantial success in view of its versatility. Particularly, this equipment permits the number of shelves, and the vertical spacing therebetween to be selectively varied. This equipment also permits the storage of large quantities of objects while enabling the shelves or baskets to be stocked with items or articles in a simple manner. This type of display equipment is also durable and economical.

Thus, display equipment of the above-mentioned type is widely utilized in view of the advantages associated therewith. However, a primary disadvantage of this type of display equipment is its inability to be readily moved about, particularly when in an assembled and loaded condition. This known display equipment has normally been movable only by first unloading the shelves, and then removing the shelves so that the frame or base can be moved (as by a dolly or other device) to the desired location. The shelves then have to be remounted on the frame and restocked with merchandise. This obviously represents a laborious and time consuming operation, so that this equipment is accordingly utilized primarily as stationary shelving and is thus not often moved about.

It is thus an object of the present invention to provide a mobile merchandising apparatus, specifically a mobile merchandising cart, which possesses all of the advantages possessed by the stationary display equipment described above, and in addition possesses the further advantage of being readily movable even when in a fully assembled and loaded condition so as to permit its movement to any desired location.

A further object is to provide a mobile merchandising cart, as aforesaid, which can utilize thereon a plurality of removable shelves (or baskets) so that both the number and spacing of the shelves can be selected as desired.

Still a further object is to provide a mobile merchandising cart, as aforesaid, which utilizes a wheeled frame having a plurality of shelves or baskets removably supported thereon, which cart is designed to utilize thereon baskets or shelves which can also be used with conventional stationary display equipment employing slotted upright posts.

Another object is to provide a mobile merchandising cart, as aforesaid, which is economical to manufacture and durable in operation, and which can be easily and safely moved about when fully assembled and loaded with merchandise.

It is also an object of the present invention to provide a mobile merchandising cart, as aforesaid, which can be readily grouped with stationary display equipment of the type described above so as to be compatible in operation and similar in appearance thereto.

Other objects and purposes of the invention will be apparent to persons familiar with such equipment upon reading the following specification and inspecting the accompanying drawings.

BRIEF DESCRIPTION OF THE DRAWINGS

FIG. 1 is a perspective view of a mobile merchandising cart according to the present invention, same being shown with only one shelf mounted thereon to simplify illustration of the cart.

FIG. 2 is a front view of the cart.

FIG. 3 is an end elevational view as taken from the right side of FIG. 2.

FIG. 4 is a top view of the cart as appearing in FIG. 2.

Figure 5:
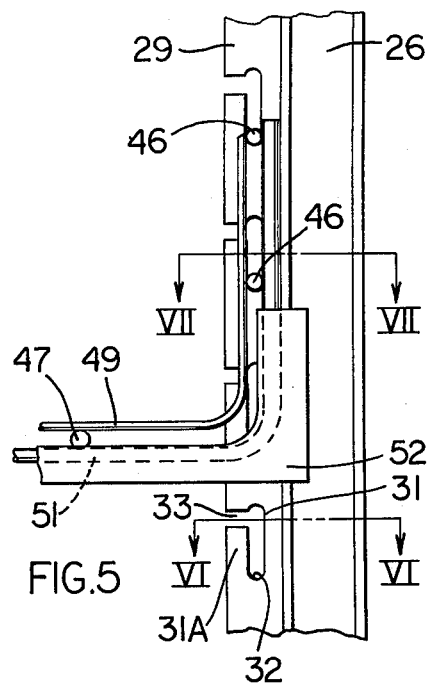
FIG. 5 is an enlarged, fragmentary view illustrating the manner in which a shelf is mounted on the notched uprights.

Certain terminology will be used in the following description for convenience in reference only and will not be limiting. For example, the words "upwardly", "downwardly", "rightwardly" and "leftwardly" will refer to directions in the drawings to which reference is made. The words "front" and "rear" will refer to the left and right sides, respectively, of the cart illustrated in FIG. 3. The words "inwardly" and "outwardly" will refer to directions toward and away from, respectively, the geometric center of the cart and designated parts thereof. Said terminology will include the words specifically mentioned, derivatives thereof and words of similar import.

SUMMARY OF THE INVENTION

The objects and purposes of this invention are met by providing a mobile merchandising cart having a wheeled base and a plurality of wire-rod baskets or shelves removably mounted thereon. A pair of notched upright posts are fixed to the base and project upwardly therefrom in substantially parallel relationship. Each of the upright posts has a notched strip associated therewith. A wire-rod shelf is adapted to be removably mounted on the posts in a horizontally disposed position wherein the shelf extends between the posts and projects outwardly therefrom in a cantilever fashion. The shelf has a rear wall which is provided with a pair of horizontally extending, vertically spaced rods. These rods extend between the posts and are engaged within notches formed in the strips for mounting the shelf on the posts. If the shelf has mounting brackets associated therewith of the type commonly used for permitting the shelf to be mounted on slotted uprights, then these brackets project rearwardly along the outer sides of the posts so as to not interfere with the mounting of the shelf on the cart.

DETAILED DESCRIPTION

FIG. 1 illustrates therein a mobile merchandising cart 11 according to the present invention. The cart 11 includes a frame 12 having a plurality, here four, of rollers or casters 13 for rollingly supporting the cart. A plurality of removable shelves or baskets 14 are adapted to be mounted on the frame 12, only one such basket being shown in the drawings for simplicity of illustration.

The frame 12 includes a substantially U-shaped base 16 which has substantially parallel legs 17 and 18 joined by a cross brace 19. A pair of substantially parallel upright posts 21 and 22 project vertically upwardly from the base 16 adjacent the rear corners thereof. The posts 21 and 22 are also fixedly interconnected adjacent their upper ends by means of a tubular cross brace 23 extending therebetween. The upright posts 21 and 22 are identical except for being mirror images of one another.

Figure 6:
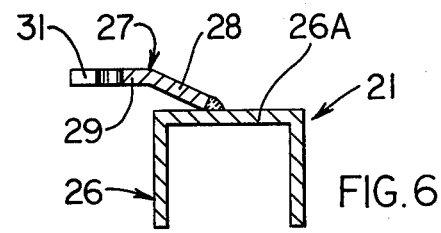
FIG. 6 is a sectional view taken along the line VI—VI in FIG. 5.
Figure 7:
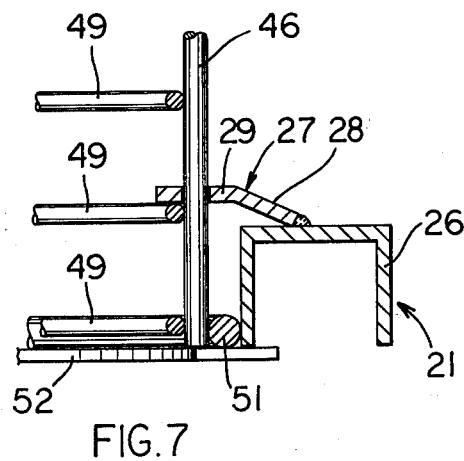
FIG. 7 is a sectional view taken along the line VII—VII in FIG. 5.

The upright post 21, as illustrated in FIGS. 2–7, includes a vertically elongated channel member 26 which opens sidewardly of the cart and has a platelike mounting member or strip 27 fixed thereto, which strip 27 extends longitudinally of the channel member 26 throughout substantially the complete length thereof. In this embodiment, the platelike strip 27 has a shallow V-shaped cross section as shown in FIGS. 6 and 7. A rear leg 28 of the strip 27 is fixedly secured to the bottom wall 26A of the channel member 26, as by being welded thereto. Rear leg 28 projects outwardly at an acute angle relative to the bottom wall 26A and terminates in a front leg 29 which projects toward the front of the cart. The front leg 29 is substantially parallel to but laterally spaced from the bottom wall 26A, whereby the front leg 29 is spaced forwardly of the channel member as illustrated in FIG. 6. Front leg 29 has a plurality of notches 31 formed therein. The notches 31 are vertically spaced along the longitudinally extending length of the strip 27 and result in the formation of hooks 31A which open upwardly and outwardly of the strip. Each notch 31 (FIG. 5) includes a substantially vertically elongated slot 32 which, at its upper end, communicates with a transversely extending slot 33 which opens outwardly through the front free edge of the leg 29.

The lower ends of the posts 21 and 22 are each fixedly secured with respect to the U-shaped base 16. For this purpose, each corner of the U-shpaed base has three mutually perpendicular gusset plates 36, 37 and 38 associated therewith, which plates fixedly interconnect the cross brace 19, the respective upright post 21 or 22, and the respective leg 17 or 18 in mutually perpendicular relationship.

The rear gusset plate 36 is disposed substantially vertically and overlies the rear leg of the channel member 26 and the rear wall of the cross brace 19, which gusset plate is suitable welded to these two members. The horizontal gusset plate 37 passes under and is welded to the lower surface of the cross brace 19, which gusset plate horizontally overlies the upper surface of the respective leg 17 or 18 and is suitable fixed thereto, as by bolts 39. The remaining gusset plate 38 also extends vertically and is welded to the outer surface of the rear wall 26A of the channel member 26, which gusset plate 38 projects forwardly so as to overlap the outer sidewall of the respective leg 17 or 18. The gusset plate 38 is fixedly secured to the respective leg 17 or 18, as by further bolts 41.

Considering now the shelf 14, same is normally of a wire rod construction and may possess various structural and geometrical features. The specific configuration of the shelf 14 illustrated in the drawings, and described below, is set forth merely for purposes of example.

The self 14 includes a pair of parallel and vertcially sapced wires or rods 46 which extend horizontally and form a part of the rear wall of the shelf. A similar pair of spaced and substantially parallel, horizontally extending wires or rods 47 extend under the bottom of the shelf, and a further pair of vertically spaced, substantially parallel, horizontally extending wires 48 are associated with the front wall of the shelf. A plurality of substantially parallel, upwardly opening, U-shaped wire or rod elements 49 are supported on and welded to the longitudinally extending rod elements 46, 47 and 48 so as to form the shelf. A plurality of heavier reinforcing elements or rods 51 are secured to some or all of the longitudinally extending rods 46–48 for strengthening the shelf. In the illustrated embodiment, the reinforcing rods 51 are disposed closely adjacent the opposite ends of the shelf and are of an L-shaped configuration. The reinforcing rod 51 has a vertical leg portion which is welded to the rear sides of the rods 46, and a horizontal leg portion which underlies the bottom of the basket and is welded to the undersides of the rods 47. The reinforcing rods 51 can also extend outwardly around the front of the shelf and be welded to the rods 48 if desired. While the illustrated embodiment shows rods 51 located adjacent the ends of the shelf, additional such rods can be located at selected intervals longitudinally along the shelf depending upon the size and strength requirements thereof.

An L-shaped, platelike brace 52 is fixedly connected to each end of the shelf, such as by being welded to the adjacent reinforcing rod 51.

The shelf 14 can also be provided with suitable end walls either fixedly or removably associated therewith, if desired. Further, the height of the front wall will obviously depend upon the type of shelf (or basket) being used and, if desired, the front wall of the shelf can be totally eliminated. The construction of the shelf or basket 14 is described in greater detail in my U.S. Pat. No. 3,495,718. However, it will be appreciated that substantial variations can be made in the structure of the shelf without departing from the present invention.

In the present invention, the wire rods 46 as associated with the rear of the shelf are vertically spaced apart by a preselected distance, which distance is also used for determining the vertical spacing between the notches 31 formed in the upright posts. In a preferred embodiment, the adjacent notches 31 are spaced apart by a vertical distance equal to the spacing between the rods 46. However, if a closer spacing of adjacent notches is desired, then such is possible so long as the spacing between the rods 46 constitutes a whole number multiple of the spacing between the adjacent notches 31.

OPERATION

To utilize the mobile merchanising cart 11, the desired number of shelves 14 are first mounted on the uprights 21 and 22 so that the shelves are in a desired vertically spaced relationship. To mount each individual shelf on the cart, the rear wires 46 associated with each shelf are inserted into the slots 33 associated with a pair of notches 31. The shelf is then moved downwardly so that the wires 46 bear against the walls which define the lower ends of the slots 32. These slots 32 thus confine the wires 46 so as to stably support the shelf on the posts in a cantilevered manner. The notches 31 engage the wires 46 adjacent the opposite ends of the shelf at locations which are spaced inwardly from the reinforcing rods 51 and the braces 52, whereupon the vertical legs of the reinforcing rods 51 are positioned so that they bear against the front sidewall of the channel members 26 and thereby assist in resisting downward bending movement of the shelf when loaded. The braces 52 project rearwardly past the front legs of the channel members 26, as illustrated in FIG. 5, whereby the braces 52 do not interfere with usage of the shelf on the mobile cart according to the present invention.

After the shelves have been suitably mounted on the cart and loaded with merchanise, then the loaded cart can be readily moved about as desired. For example, the shelves as mounted on the cart can be loaded in a store room, with the loaded cart then being moved into a display area. Further, the mobile loaded cart can be moved about to different locations within a store so as to provide for optimum exposure of the merchandise which is being displayed in the cart. This cart can also be moved into existing locations in a store which previously utilized stationary shelving without resulting in any loss of shelf or storage space.

While the mobile merchandising cart has been illustrated and described as possessing only a single column of shelves mounted on one side of the uprights 21 and 22, it will be appreciated that the present invention can also be modified so as to constitute a two-sided cart. That is, the base could be of a substantially H-shaped configuration so as to have legs which project outwardly from both sides of the upright posts 21 and 22, which upright posts 21 and 22 could also have strips 27 associated therewith which project outwardly from both sides of the posts to thereby define rows of notches or hooks on both sides of the uprights. In this manner, a column of shelves could thus be provided on both sides of the cart. Such a double-sided cart is particularly desirable in those situations where it is desired to use the cart as a merchanising island having maximum exposure of goods while presenting a desirable appearance.

MODIFICATIONS

Figure 9:
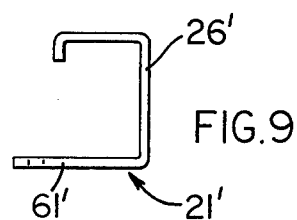
FIG. 9 is a top view of the upright in FIG. 8.
Figure 8:
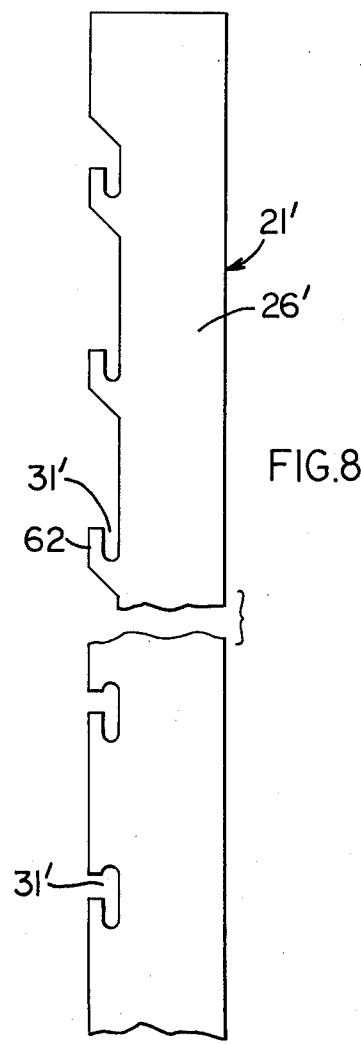
FIG. 8 is a side view of a modified upright.

FIGS. 8 and 9 illustate therein a modified construction for the upright posts, which modified construction has been referred to as 21'. In the post 21', same is again constructed from a channel-shaped member 26' but, in this embodiment, the channel member 26' opens forwardly of the cart, rather than sidewardly as in FIGS. 1-7. The channel member 26' has the inner leg 61 thereof extended forwardly so as to have the notches 31' formed therein. The notches 31' can be formed as slots as illustrated in the lower portion of FIG. 8, or alternately the notches 31' can be formed by hooklike projections 62 which project outwardly and upwardly from the forward edge of the leg 61.

Figure 11:
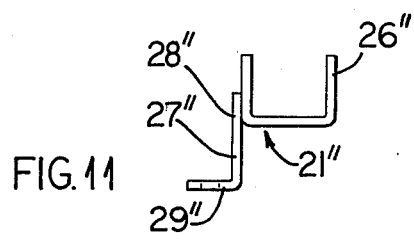
FIG. 11 is a top view of FIG. 10.
Figure 10:
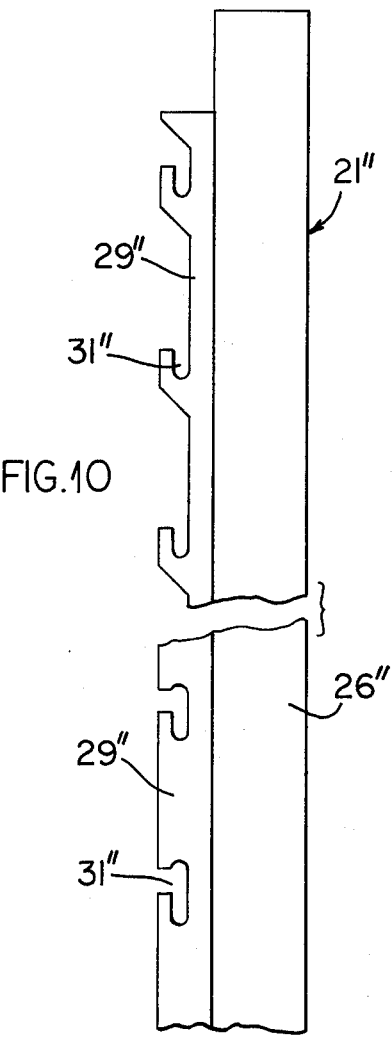
FIG. 10 is a side view of a further modification of the upright.

FIGS. 10 and 11 illustrate a further modification of the upright post 21" which again inlcudes a channel member 26" which opens sidewardly of the cart. In this variation, the strip 27" is of an L-shaped configuration and has the rear leg 28" welded to the front of the channel member, and has the front leg 29" projecting forwardly of the channel member and having the notches 31" formed therein.

Figure 12:
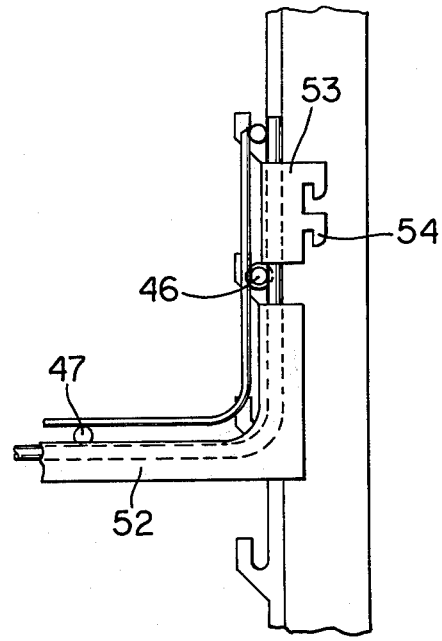
FIG. 12 is a view like FIG. 5 and showing a modified construction.

FIG. 12 illustrates a further modification wherein brackets 53 having hooks 54 thereon are slidably mounted on one of the rods 46. The hooks 54 project rearwardly of the brace 52 and they are adapted to be inserted into the slots in stationary upright slotted posts, whereby the shelf of FIG. 12 can be used in conjunction with both the described mobile merchanising cart as previously described and with conventional stationary shelf supports. The brackets 53 can be the same as those described in my U.S. Pat. No. 3,495,718 and reference should be made thereto for further details concerning these brackets.

The merchanise cart is comprised of three subassemblies; namely, the two identical caster beam units comprised of the respective legs 17 and 18 and the casters attached thereto, and the upright and bracing subassembly comprising the uprights 21 and 22, the gusset plates 36, 37 and 38 associated therewith, and the cross-braces 19 and 23. The upright and bracing subassembly is secured to the caster beam units by bolting as above described.

It will be noted that rear walls of the uprights 21 and 22 and the gusset plates 36 lie in a substantially vertical plane, and the casters can be disposed entirely forwardly of that plane so that the cart can be positioned closely adjacent upright walls in stores to fit into existing compartments therein. Also, as appearing in FIG. 2, all of the parts are located inside of the outer edges of the uprights 21 and 22, and the shelves extend to said outer edges of the uprights so that the merchandise cart provides the maximum lineal shelf area for the size of the cart, i.e., there is no wasted space.

The merchanides cart provides essentially the same shelf space as conventional stationary shelving of the same dimensions. The merchandise cart can be loaded with merchandise in a back room or storage area of the retail store and can be wheeled into position in the store to replace a like cart from which the merchandise has been depleted. In this way, merchandise can be made more continuously available without having to stock the shelving with merchandise while the shelving is in the selling area.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mobile merchanising cart, comprising:
base means;
wheel means mounted on said base means for rollingly supporting said base means on a support surface, such as a floor;
a pair of upright posts fixed to said base means and projecting vertically upwardly therefrom, said posts being substantially parallel and spaced a preselected distance apart;
each post having an elongated vertical mounting member extending longitudinally thereof and projecting frontwardly therefrom toward the front of said cart, said mounting member having a plurality of notches which are uniformly vertically spaced apart and are arranged in a vertical row which extends longitudinally of the post over a substantial portion of the length thereof, each notch being comprised of an upright slot having a closed bottom and a transversely extending slot at the upper end of said upright slot and extending frontwardly therefrom through the frontward edge of said mounting member, the notches in the mounting member of one of said posts each being horizontally aligned with a corresponding slot in the mounting member of the other of said posts;

at least one horizontally elongated shelf extending horizontally between and being removably supported in cantilevered fashion on said pair of posts, said shelf including a substantially vertically extending rear wall and a substantially horizontally extending bottom wall fixedly connected to said rear wall and projecting frontwardly therefrom;

a pair of parallel horizontally extending rods mounted on the rearward side of said rear wall and received within a pair of said notches in each post of said pair of posts, and each rod being sized to be movable through one of said transverse slots and into the corresponding said upright slot of the mounting member of its associated post, said pair of rods projecting rearwardly from the rearward side of said rear wall and being vertically spaced apart a preselected distance substantially corresponding to the vertical spacing between the bottoms of a pair of said upright slots and being received within a pair of said upright slots in the associated mounting member so that said shelf is removably supported on said posts in a cantilevered manner with the frontward edges of said mounting members projecting frontwardly of said rods.

2. A cart according to claim 1, wherein said shelf is of a wire rod construction.

3. A cart according to claim 2, wherein said shelf includes a front wall which projects upwardly from said bottom wall adjacent the front edge thereof, said rear wall projecting upwardly from said bottom wall adjacent the rear edge thereof, whereby said shelf has an upwardly opening channel-shaped configuration.

4. A cart according to claim 2, wherein said base means comprises a substantially U-shaped base having a substantially horizontally extending support beam and a pair of substantially horizontally extending leg members fixed to and extending perpendicularly from the opposite ends of said support beam, and said posts are fixedly connected to and project upwardly from said support beam adjacent the opposite ends thereof.

5. A cart according to claim 4, wherein each post comprises a vertically elongated channel-shaped member, and said mounting member comprises a vertically elongated platelike strip which is fixed to said channel-shaped member and extends longitudinally thereof, said platelike strip having said plurality of vertically spaced notches formed in the front edge thereof.

6. A cart according to claim 4, wherein said base means consists of said U-shaped base.

7. A cart according to claim 1, wherein the rods adjacent one post are integral with corresponding rods adjacent the other post.

8. A cart according to claim 1, wherein said shelf has a vertical rod mounted thereon adjacent each end of said shelf, said vertical rod being disposed rearwardly of its associated pair of horizontal rods and rearwardly of said notches in the adjacent mounting member, said vertical rod being disposed sidewardly of and substantially parallel to the adjacent mounting member to prevent any substantial displacement of the shelf in the longitudinal direction thereof relative to said posts.

9. A cart according to claim 1, wherein said mounting members are sheet-form members which are parallel to each other and are located inwardly of said posts, the rear wall of said shelf is comprised of a plurality of parallel, upright, horizontally spaced rods, the forward edges of said mounting members projecting through the spaces between adjacent pairs of the upright rods defining said rear wall, a pair of vertical reinforcing rods at the opposite ends of the shelf, said reinforcing rods being disposed outwardly of said mounting members and projecting rearwardly of said horizontal rods on the rearward side of said rear wall and bearing against the front sides of said posts, respectively, and a pair of braces mounted on the opposite ends of said shelf outwardly of said reinforcing rods and projecting rearwardly therebeyond into overlapping relationship with the outer sides of the posts, respectively.

* * * * *